July 2, 1935. R. M. ZIMBER 2,006,818
METHOD AND MEANS OF MANUFACTURING LAMPS, VACUUM TUBES AND SIMILAR DEVICES
Filed April 4, 1930 2 Sheets-Sheet 1
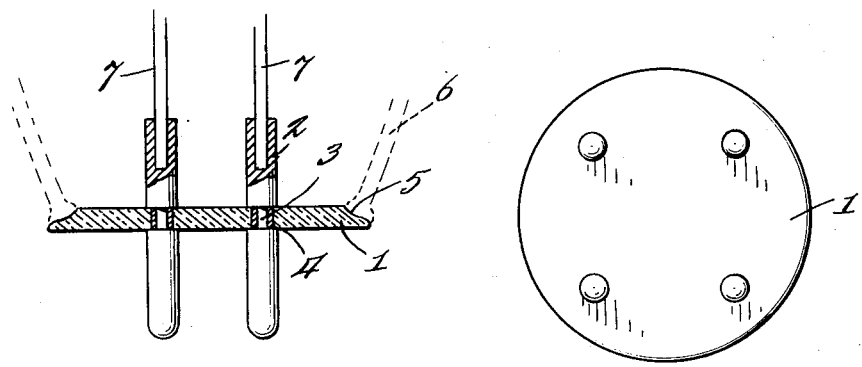
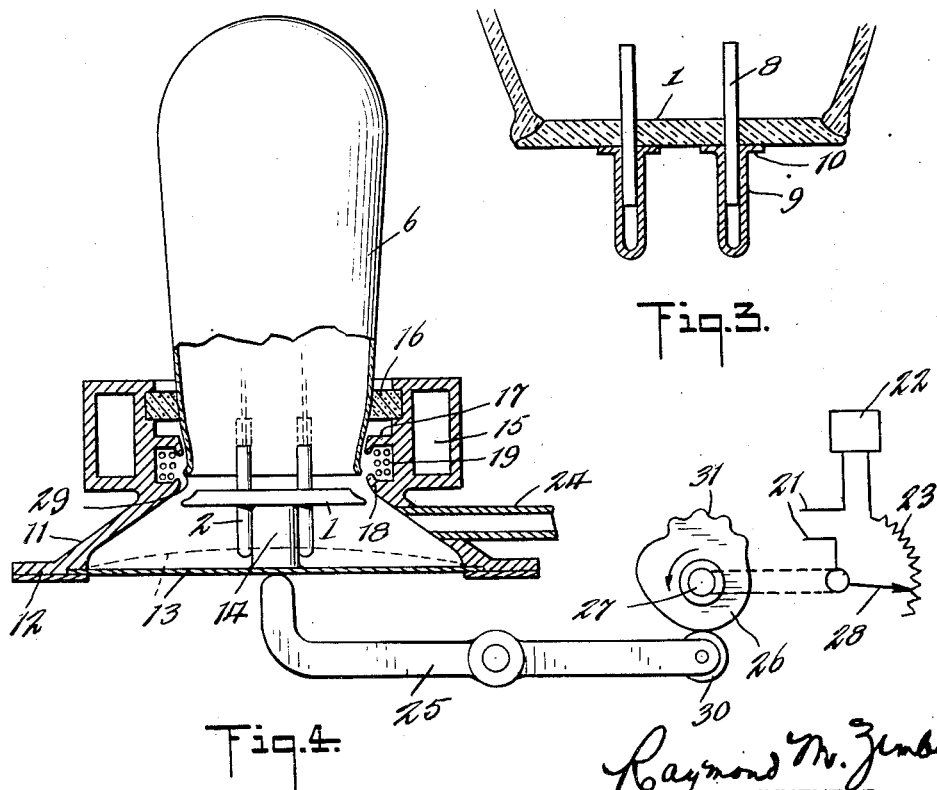
Raymond M. Zimber
INVENTOR
BY his
Darby & Darby
ATTORNEYS July 2, 1935.  R. M. ZIMBER  2,006,818
METHOD AND MEANS OF MANUFACTURING LAMPS, VACUUM TUBES AND SIMILAR DEVICES
Filed April 4, 1930  2 Sheets-Sheet 2
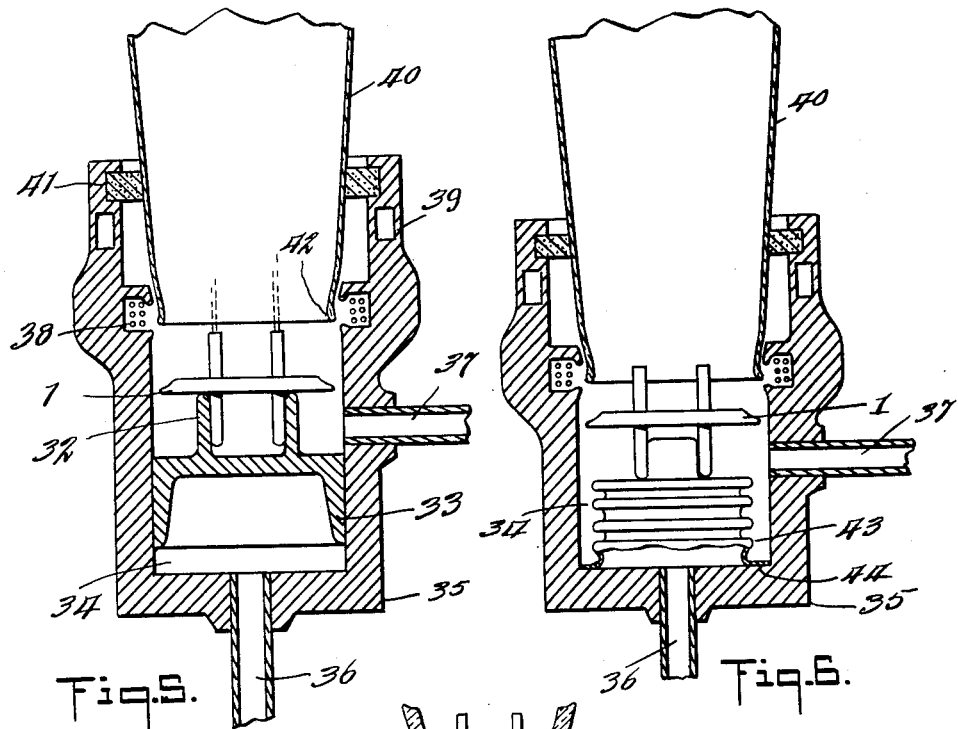
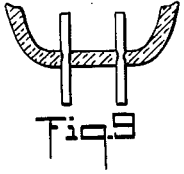
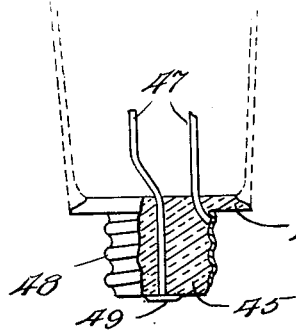
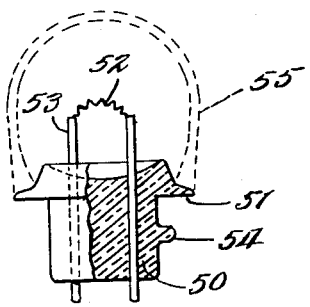
Raymond M. Zimber
INVENTOR
BY his
Darby + Darby
ATTORNEYS Patented July 2, 1935

2,006,818

UNITED STATES PATENT OFFICE 2,006,818

METHOD AND MEANS OF MANUFACTURING LAMPS, VACUUM TUBES, AND SIMILAR DEVICES

Raymond M. Zimber, Bloomfield, N. J., assignor, by mesne assignments, to Radio Corporation of America, a corporation of Delaware Application April 4, 1930, Serial No. 441,459

8 Claims. (Cl. 176—2)

This invention relates to the art of manufacturing electric lamps, audions, etc., and with particularity to novel and efficient methods of assembling and evacuating such devices.

Heretofore in the manufacture of such devices as incandescent lamps, audions, gaseous conduction lamps, etc., there has been required a great number of separate operations each requiring a separate machine or mechanism. Consequently a considerable time interval elapsed between the assembly of the several components and the actual sealing-off of the tube or lamp and the subsequent basing. Thus in the usual method of manufacturing such devices as audions there were required between twelve and fifteen different operations each of which is time consuming and obviously increasing the percentage of shrinkage in the completed products.

In accordance with the principles of the present invention, the manufacture of such devices as audions, etc. may be accomplished in four or five separate operations.

Accordingly it is one of the principal objects of the present invention to provide a highly efficient method of manufacturing lamps, audions, etc. whereby the cost per unit production and the shrinkage is reduced to a minimum.

Another object is to provide a novel method of evacuating lamps, audions, etc. whereby a more nearly perfect vacuum is attained than is possible with prior art machines and methods.

A further object is to provide a novel method of mounting the element or elements of a vacuum tube or lamp.

A further object is to provide a novel method of sealing a lamp, audion, etc. after the evacuation is completed.

A still further object is to provide a machine for manufacturing vacuum tubes, lamps etc. wherein the mount carrying the electrodes or elements may be assembled with respect to the main envelope and at the same time exhausted.

A feature of the invention relates to a novel type of "mount" for vacuum tubes, lamps, etc. In accordance with this feature of the invention the glass bar of the mount is adapted to be molded around one or more metal posts or pillars which in the case of audions may serve the double purpose of supporting the elements or electrodes within the device, and also may serve as the usual contact-prongs.

Another feature of the invention is to provide an audion, lamp or similar device wherein the usual press and seal-in wires are eliminated.

Another feature resides in a novel type of base for lamps, audions, vacuum tubes, etc.

Another feature resides in the mechanism for effecting sealing of the lamp, audion, etc. according to the invention.

Another feature of the invention resides in an audion or vacuum tube wherein the usual insulating base is eliminated and also the usual operations of welding the base and soldering the lead-in wires to the contact prongs or members.

A still further feature relates to a mechanism for effecting the exhaustion of a lamp envelope without the use of so-called exhaust tubes. As a result of this feature a maximum volume of air is exhausted per unit time and the loss due to friction attendant upon the use of ordinarily constructed exhaust tubes is entirely eliminated. The time of exhaustion is therefore decreased and a more nearly perfect vacuum attained.

A further feature relates to a novel type of lamp that may be used for head-lights, flash lights and similar purposes.

Other features and advantages of the invention not specifically enumerated will be apparent after a consideration of the following detail descriptions and the appended claims.

Referring to the drawings;

Fig. 1 shows a combined mount and base embodying principles of the invention;

Fig. 2 is a bottom plan view of the device shown in Fig. 1;

Fig. 3 is a modification of the combined mount and base shown in Fig. 1;

Fig. 4 is a schematic representation of a machine carrying out principles of the invention;

Fig. 5 is a modified form of the machine shown in Fig. 4;

Fig. 6 shows a still further modification of the machine shown in Fig. 4;

Fig. 7 illustrates the principles of the invention as embodied in an incandescent lamp; and Fig. 8 illustrates the invention as embodied in a head-light or flash light member.

Fig. 9 shows a modified form of base according to the invention;

Fig. 10 shows another type of base embodying features of the invention.

Referring to Figs. 1 and 2, the numeral I represents a plate or disc of insulating material such as glass or other fusible insulating material which forms the base of the lamp or audion, as hereinafter described. While this base is shown circular in Figs. 1 and 2, it will be understood that any other desired shape may be employed. Passing through the base I are a plurality of rods or posts 2. In one phase of the invention these posts may be made out of a single metal such as tantalum or dumet, or any other material which has substantially the same coefficient of expansion as glass. In another phase of the invention instead of employing a solid rod of tantalum or dumet, the rod may be formed out of a cheap metal such as nickel, brass, etc., having a constricted portion of reduced diameter as indicated by the numeral 3. Surrounding the constricted portion 3 of each rod there may be a coating or layer of dumet, tantalum or other material having the same coefficient of expansion as the glass 1, as indicated by the numeral 4. The posts are preferably molded into the glass base 1 in any well known manner, so that the glass surrounding each post flows around and seals itself to the constricted portion 3 of each rod. Thus the disc 1 may be positioned within a suitable mold and heated to the fusing point whereupon the rods 2 may be passed through the disc and the disc subjected to pressure to cause the molten glass adjacent the rods to flow around and adhere thereto. As a result of this arrangement the rods are firmly held in the glass base 1 and due to the coating or coatings of material 4 they are hermetically sealed into the glass. While a molding operation is the preferred form since the glass will then flow around the rods, it will be understood that any other efficient manner of sealing-in the rods may be employed.

As will be noted from an inspection of Fig. 1, the edge of the circular base 1 is chamfered or tapered as indicated by the numeral 5, so as to facilitate and insure the proper sealing between the base 1 and the main envelope 6, as will be described hereinafter. Thus the portions of the rods 2 that extend downwardly from the base 1 (Fig. 1) may serve as the usual contact prongs ordinarily provided with vacuum tubes, audions, and similar devices, and for this purpose the lower ends of the rods are preferably rounded as shown. The upwardly projecting ends of the rods, or the ends which are within the envelope 6 when the device is completed, may serve as the supports for the electrodes or other elements within the device, and for this purpose the upper ends of the rods are preferably recessed or bored to receive the smaller wires 7 which are attached to the electrode or electrodes. It will be understood, of course, that the wires 7 are preferably integrally united with the rods 2, either by welding, brazing, soldering, or other similar operation. As a matter of fact, the wires 7 may constitute integral reduced extensions of the rods 2, if so desired.

Instead of employing rods of the type disclosed in Fig. 1, there is shown in Fig. 3 a combined base and mount wherein the rods 8 may be of smaller diameter, and are molded into the glass base 1, as hereinabove described. These rods 8 may be made out of a single material such as tantalum, tungsten or other metal having the same coefficient of expansion as the glass 1, or the rods 8 may be of cheap material and provided with the reduced portion and a coating or layer of suitable material where the rod is molded into the base 1, also as hereinabove described. In order to strengthen the rods 8 and at the same time provide proper contact surfaces, the rods may have united thereto in any manner, such as by welding, brazing, soldering, etc., the thimbles 9 which may be of brass or other suitable metal. The thimbles 9 are preferably provided with flanged portions 10 where they engage the base 1, and may if desired be fused or molded into the base at the same time or subsequent to the molding-in of the rods 8.

Referring to Fig. 4 there is shown in diagrammatic form one manner of assembling the combined mount and base according to the invention with the main envelope 6 at the same time that the envelope is subjected to evacuation. In Fig. 4 the numeral 11 represents a casing of any suitable shape having a relatively wide, and preferably circular base 12, which is closed by means of the thin flexible diaphragm 13. This diaphragm may be made out of any thin metal, or even rubber if desired. Attached to the diaphragm 13 is a pillar 14 for supporting the base 1, which may be of the type shown in Figs. 1 and 3. Instead of employing a solid pillar 14 for this purpose a pillar may be provided with a plurality of recesses to receive the posts 2 and thus accurately position the combined base and mount on the pillar 14. The casing 11 is formed at its upper end with an integral annular housing or conduit 15 which may be connected to a cooling medium for purposes hereinafter described. Attached in any convenient manner to the interior face of the annular portion 15 is an annular gasket or washer 16 which is preferably of rubber or other resilient material. Casing 11 is also provided with a pair of inwardly extending annular flanges 17 and 18 to provide a support for the circular heating coils 19 which may be connected through the conductors 20 and 21 to a suitable source of heating current 22, preferably through the adjustable resistance 23. Communicating with the lower enclosed portion of the casing 11 is a pipe 24 which may be connected to any suitable pump for evacuation.

For the purpose of oscillating the diaphragm 13 and consequently raising the base 1 into sealing engagement with the lip of the envelope 6, there is provided a lever 25 which is actuated by a cam 26. The diaphragm 13 is shown in Fig. 4 in its lowermost position at which point the evacuation is commenced. As the evacuation proceeds the shaft 27 rotates the cam 26 and gradually raises the diaphragm 13 and the base 1 which is resting thereon, until said base comes into engagement with the lip of the envelope 6. While the base 1 is thus being moved upwardly at the same time that the envelope 6 is being evacuated the heating coils 19 heat the lip or rim of the envelope 6. It is preferred to couple the variable resistor arm 28 to the shaft 27 so that as the diaphragm 13 rises a corresponding amount of resistance is cut out of circuit and the envelope lip 29 becomes heated to the fusing point. At this instant by any suitable mechanical means properly timed with the operation of shaft 27 the evacuating pump may be disconnected, although this latter is not necessary. When the double edge of the base 1 comes into contact with the heated rim or lip 29 the follower 30, of lever 25 engages the portion 31 of cam 26, and subjects the diaphragm 13, as well as the base 1 to an oscillatory movement. This movement is necessary in order to insure perfect fusing or union between the base 1 and the envelope lip 29. After the sealing has been completely effected, which of course may be regulated by the cam 26, the current to the coils 19 may be interrupted to allow the fused portion of the base and envelope to cool sufficiently to enable the sealed device to be removed from the machine.

From the foregoing description it will be clear that the function of the gasket 16 is to enable the envelope 6 to be inserted in the machine and sealed to provide a seal between the wall of the envelope and the casing 11, and for this purpose the chamber 15 is preferably connected to a source of running water or other means to cool the casing and prevent the heat of the coils 19 from destroying the gasket 16. It will be understood that the disposition of the coils 19 as shown in the drawings is merely schematic, and preferably the coils are so designed and arranged as to concentrate the heat in what may be termed an annular area adjacent to the lip 29 of the envelope.

From the foregoing operation it will be seen that the envelope is subjected to evacuation at the same time that the base 1 carrying the contact prongs 2 is assembled into sealing relation with the envelope. Likewise it will be noted that when the base is in its lower position the effective evacuating orifice is substantially of the same cross section as the open end of the bulb but as it moves upwardly this effective cross section is gradually reduced until the base actually contacts with the lip 29. This is in accord with well established principles of evacuation since the highest efficiency is attained when the maximum volume of air can be withdrawn during the preliminary stages until the vacuum is reduced to a certain minimum, whereupon further complete evacuation is more efficiently achieved when the evacuating orifice is reduced.

Heretofore the usual practice has been to seal the lead-in wires into a reentrant portion or press, and this has necessitated the employment of a relatively small and constricted exhaust tube. Due to the smallness of this tube there is a considerable loss and time wasting due to the extremely limited volume of air that can pass through the exhaust tube in a given unit time, and due to the constricted character of the tube, frictional losses are likewise introduced.

As will be seen from the foregoing description the machine of Fig. 4 provides a substantially free path of relatively large effective cross sectional area between the bore and the envelope 6. Consequently the envelope 6 may be evacuated to a more nearly perfect vacuum and in a shorter time than is possible with the prior art exhaust tubes. One of the reasons why such a high degree of vacuum can be obtained with the present method is that the number of joints between the bore and the exhaust tube is reduced to a minimum.

It will be understood that the disclosure of Fig. 4 is employed merely for the purpose of illustrating one manner of practicing the invention. It will be understood that the invention is not limited thereto, the fundamental idea of the evacuating method being the exhaustion of the lamp envelope directly without the use of relatively constricted exhaust tubes.

Referring to Fig. 5 there is shown schematically a machine embodying the features disclosed in the machine of Fig. 4, but with different means for carrying out the functions. In the embodiment of Fig. 5 the combined base and mount 1 is first positioned on the annular flange 32 which is formed integrally with the piston 33. Piston 33 is adapted to be reciprocated within the chamber 34 by means of fluid pressure, and for this purpose the casing 35 is connected by pipe 36 to any suitable source of fluid under pressure. Communicating with the chamber 34 is a pipe 37 which leads to any well known type of evacuating pump. Heating coils 38 similar to the heating coils 19 of Fig. 4 are employed, and a water cooling jacket 39 may be employed for similar reasons. The manner of using the machine of Fig. 5 is substantially along the following lines. With the piston 33 in its lowermost position a base 1 is placed upon the support 32 and then the envelope 40 is positioned within the gasket 41 to such a point that the lip 42 of the envelope is in registry with the heating coils 38. The evacuating pump may then be operated and at the same time fluid admitted to the chamber 34 causing the piston 33 and the base 1 to rise until the base 1 engages the lip 42. At this time, as hereinbefore described, the lip 42 fuses into the knife edged rim of the base 1, and by any suitable means (not disclosed) the fluid pressure may be varied to oscillate the piston 33, and thus effect a proper fusion or union between the base and the envelope 40. As will be noted from an inspection of Fig. 5, the piston 33 during its upward travel may serve to cut off the pipe 37 slightly before or just as the base 1 is being fused with the lip 42. After the evacuation and sealing are thus completed the fluid is allowed to flow from chamber 34 and the piston 33 descends and the sealed and evacuated lamp or audion may be removed from the machine.

Referring to Fig. 6 there is shown a still further modification of the device shown in Fig. 4. In this embodiment instead of enabling the piston to raise the base 1 into engagement with the envelope 40, a sylphon arrangement 43 may be employed, this sylphon being brazed, welded or soldered around its edge 44 to the casing 35. The further operation of the device is substantially the same as that described in connection with Figs. 4 and 5, with this explanation however that the sylphon 43 in rising does not cut off the exhaust pump from the chamber 34. However, it will be obvious that the sylphon may be provided with means for cutting off the pump substantially similar to the manner in which the piston 33 does.

Referring to Fig. 7 there is shown the manner of embodying principles of the invention as applied to a screw socket type of lamp such as ordinarily used for electric lighting. In this figure the base instead of being formed out of a disc of glass or other fusible material is formed in the shape of a solid cylindrical portion 45 having an integral flanged rim 46. Molded into the portion 45 in the manner described in connection with Figs. 1, 2 and 3, are a pair of rods 47 which may serve as lead-in wires, and also as supports for the filament or other incandescent elements within the lamp. As will be seen from Fig. 7, the peripheral surface of the portion 45 and the base is formed with a screw thread depression corresponding to that ordinarily employed in incandescent lamps. It will be obvious that the base 45 with the flange 46 and the screw thread depression therein may be formed in a single molding operation. As a matter of fact the molding of the base 45 and the assembly of the rods 47 therein may be effected in a single operation if desired. In any well known manner a metal sheath 48 is fastened around the base 45 and soldered or brazed to one of the rods 47, the other rod 47 extending centrally through the base 45 and is attached to a contact button 49 in the usual manner.

Referring to Fig. 8 there is shown how the invention may be embodied in a lamp suitable for use as a flash light, head light, etc. In this embodiment the base is formed preferably by molding into a solid cylindrical portion 50 having a circular flange portion 51 similar to the portion 46 of Fig. 7. The upper surface of the portion 51 is preferably concave and silvered to act as a mirror. The shape of the convexity may be any desired, for example, it may be formed in the shape of a parabola to focus the light from filament 52 in parallel rays. The rods 53 of tantalum or of any other suitable material having the same coefficient of expansion as the glass are molded into the base 50 as hereinabove described. It will be understood of course that instead of employing a solid rod of tantalum or tungsten for this purpose a rod of brass, nickel or other cheap material having a coating or layer of tungsten, dumet, tantalum or other similar material may be employed to provide the proper seal between the rod and the glass. The incandescent filament 52 may be attached to the ends of the rods 53 in any manner well known in the lamp art. When the device is to be used as a head-lamp it is the usual practice to provide a base with a bayonet joint or extension such as 54. It will be obvious, of course, that the base 50 may be molded with this extension thereon, or a separate pin may be employed. Likewise the rods 53 may extend outwardly through the base 50 to provide the necessary connections to the current source. While an envelope 55 of substantially spherical shape as indicated in Fig. 8 is employed, it will be understood that any other shape may be employed instead. Likewise instead of employing bayonet connections the connections as illustrated in Fig. 7 may be employed.

As a result of the manner of molding the filament supports into the base 50, the filament may be accurately positioned at the proper focal point with respect to the reflecting surface. The positioning of course is accomplished prior to the pumping and assembly of the envelope 55 and is therefore permanent. In the ordinary type of headlight or flashlight lamp the proper positioning of the filament at the focal point is achieved after the lamp is assembled and requires different adjustments for each lamp. With the structure shown in Fig. 8 the assembling of the filament with respect to the reflector may be made more uniform.

While in the foregoing the method of evacuating has been described as being effected through the base portion of the device, it will be understood that the device may be evacuated in the ordinary manner by means of an exhaust tubulation at any other part of the device. Thus the combined base and mount 1 (Fig. 1) may be united to the envelope 6 prior to exhaustion, and an exhaust tube may be provided at the top or any other part of the envelope and the latter exhausted in any well known manner.

Furthermore, any desired shape of base may be employed instead of the flat base shown. For example Fig. 9 shows a base in cup-shaped form, while Fig. 10 shows the base in the form of a cup with an external press or flattened portion 56 in which the prongs 57 are molded.

While specific arrangements and embodiments of the invention are disclosed in the drawings, it will be understood that the invention is not limited thereto, and various changes and modifications can be made therein without departing from the spirit and scope of the invention.

What is claimed is:

1. In a machine of the character described, a casing having a member adapted to receive the base of a lamp, vacuum tube or similar device, an opening in said casing adapted to receive a bulb to be evacuated, an evacuating pump connected to the interior of said casing, means for heating said casing and means for reciprocating said member to insure perfect union between said base and the lip of said bulb.

2. A machine according to claim 1 in which the member for receiving and supporting the base is in the form of a diaphragm adapted to close one end of said casing, the other end of the casing adapted to be closed by the insertion of a bulb to be evacuated.

3. In a machine of the character described the combination of an envelope to be evacuated, said envelope having a bulb portion and a circular lip portion, a disc like base carrying a plurality of rods sealed therein, means for moving said base to bring its edge into engagement with said circular lip, means for heating said lip and the edge of said base to effect a fusion therebetween, and means to oscillate said base during said fusion to insure a proper union between the base and bulb.

4. A machine according to claim 1 in which the member adapted to receive and support the base is in the form of a piston and means are provided for raising and lowering said piston.

5. A machine according to claim 1 in which the member to receive and support the base is in the form of an expansible diaphragm.

6. A machine according to claim 1 in which the means for receiving and supporting the base is in the form of a sylphon.

7. In a machine of the character described the combination of an envelope having a closed bulb portion and an open ended lip portion, a combined base and mount adapted to be sealed to said lip portion, means for exhausting said envelope through the open end of the lip portion, means for moving said base portion into engagement with said lip portion during the evacuation of said envelope, and means for automatically cutting off the exhaust when said base is sealed to said lip portion.

8. A machine according to claim 7, in which the means for automatically cutting off the exhaust is controlled by the means for moving the base into contact with the lip portion of the envelope.

RAYMOND M. ZIMBER.